United States Patent [19]

Christt et al.

[11] 4,059,976
[45] Nov. 29, 1977

[54] ROLLING MILL

[75] Inventors: Alfred Christ, Zurich; Rolf Lehmann, Mutschellen, both of Switzerland

[73] Assignee: Escher-Wyss Limited, Zurich, Switzerland

[21] Appl. No.: 655,767

[22] Filed: Feb. 6, 1976

[30] Foreign Application Priority Data

Feb. 13, 1975 Switzerland .................... 1765/75

[51] Int. Cl.² ............... B21B 37/00; B21B 29/00; B21B 31/32
[52] U.S. Cl. .......................... 72/19; 72/241; 72/242; 72/243; 29/113 AD
[58] Field of Search .............. 72/245, 237, 21, 19, 72/241-243; 29/113 AD, 116 AD

[56] References Cited

U.S. PATENT DOCUMENTS

| | | | |
|---|---|---|---|
| 2,651,954 | 9/1953 | Dahlstrom | 72/21 |
| 2,908,964 | 10/1959 | Appenzeller | 29/113 AD |
| 3,064,509 | 11/1962 | Ford et al. | 72/6 |
| 3,077,800 | 2/1963 | Taylor | 72/21 |
| 3,124,020 | 3/1964 | Polakowski | 72/21 |
| 3,355,924 | 12/1967 | Sendzimir | 72/241 |
| 3,724,252 | 4/1973 | Baker et al. | 72/241 |
| 3,802,044 | 4/1974 | Spillman et al. | 29/113 AD |

Primary Examiner—Milton S. Mehr
Attorney, Agent, or Firm—Pennie & Edmonds

[57] ABSTRACT

A rolling mill has a pair of working rolls each provided with one or more sag-compensating back-up rolls on the respective side of the rolling plane having a fixed support beam with a roll shell rotatable about the beam and hydrostatic support means mounted on the beam for exerting pressure against the shell. Two sag-compensating back-up rolls for each working roll define two support planes at an angle to each other. The support planes may be at equal angles to the rolling plane. With different diameter back-up rolls the support plane of the smaller diameter roll may be at a smaller angle to the rolling plane, and the smaller diameter roll may be on the downstream side of the working roll. Lateral support means for the working rolls may be provided by sag-compensating rolls or by hydrostatic support devices acting directly on the working roll surfaces. The lateral support forces may be controlled to counteract the tractive force on the material being rolled.

1 Claim, 3 Drawing Figures

ROLLING MILL

This invention relates to a rolling mill for rolling materials in web form which comprises two working rolls between which the material is rolled in a rolling plane, and corresponding back-up rolls.

Rolling mills of this kind are used, for example, for the cold rolling of metal sheets and foils. Very high line pressures occur under these conditions, with values up to 3000 kp/cm. (kiloponds/cm.) and above. Since the metal sheets or foils may be rolled to very close tolerances and the sag of the working rolls must therefore be extremely small, difficulties arise in connection with the arrangement of the back-up rolls which have to be of correspondingly large dimensions. The back-up rolls frequently themselves have to be supported by other back-up rolls, so that complicated and expensive constructions result. To make such a back-up roll arrangement possible, the diameters of the working rolls must in many cases be of relatively large diameter. This results in unnecessary loss of working power, since with small diameter working rolls the friction between the surface of the roll and the rolled material is less than with larger diameter rolls. As distinguished from the rolling work, the frictional work is a pure loss which should be kept as small as possible. Even then, in known rolling mills it is impossible to prevent sag completely.

The object of the invention is to provide a rolling mill without the above disadvantages which is much simpler and lighter in weight than the known rolling mills and which enables working roll sag to be completely eliminated and in addition requires less drive power.

To this end, the rolling mill according to the invention is characterized in that the back-up rolls are sag-compensating rolls each having a fixed support beam with a roll shell rotatable about the beam, and hydrostatic support means mounted on the beam for exerting pressure against the shell. The hydrostatic support means is positioned to exert pressure on the shell toward the working roll with which it cooperates in a support plane passing through the axes of the working and back-up roll. The hydrostatic support means may be one or more hydraulic support devices disposed along the pressure zone where the back-up roll acts on the working roll.

With such an arrangement, the sag arising from the working roll loading is completely taken up by the sag-compensating roll beam, so that the sag-compensating roll shell and hence the working roll remain straight. Since the sag of the sag-compensating roll beam may assume relatively large values without any detrimental effect, it is sufficient in practice to support a working roll by means of two back-up rolls of relatively small diameter despite the resulting high line pressures. As a result, the rolling mill is greatly simplified. It is also possible to use working rolls with smaller diameters than was previously the case, thus reducing the frictional loss of rolling and hence reducing the work required to roll a given amount of material.

The terms "sag" and "sag-compensating rolls" are in common usage in the art, and it will be understood that they include deflections produced by forces other than those due to the weight of the rolls.

Each working roll may be supported on two sag-compensating back-up rolls having hydrostatic support devices, the angles of the two support planes to the rolling plane of the material being equal. A rolling mill constructed in this way has the advantage that it can be operated equally well in both directions of rotation.

Alternatively, two sag-compensating back-up rolls of different diameters may be allocated to each working roll with different angles of the support planes to the rolling plane of the material, the angle of the smaller-diameter roll being smaller than the angle of the larger-diameter roll. With this arrangement, the larger back-up rolls take most of the pressing forces of the working rolls under operating conditions, since the pressing forces are at an angle to the rolling plane. The smaller back-up rolls on the other hand need take only a small lateral component which is due primarily to the tractive force extended on the material being rolled. Preferably the smaller-diameter back-up rolls are positioned on the downstream sides of the working rolls with respect to the direction of movement of the materials being rolled.

Alternatively, at least one of the working rolls may be provided with a sag-compensating back-up roll whose support plane is perpendicular to the rolling plane, and lateral support means is provided which is disposed on the downstream side of the working roll. With this arrangement, the vertical pressing force is separate from the lateral force extending parallel to the rolling plane, and is taken care of independently. The back-up roll need counteract only the pressing force and not a larger component as is the case with an inclined support plane. On the other hand, the lateral support means need counteract only the lateral force, independently of the pressing force, the lateral force resulting from the tractive force by which the material is pulled through the rolling mill.

The lateral supporting means may also be a sag-compensating roll with hydrostatic support means.

Alternatively, the lateral supporting means may comprise at least one hydrostatic support device bearing by its support surface directly against the surface of the working roll and receiving an hydraulic pressure medium in the form of a coolant for cooling the working roll. In this way, in addition to simplification of the rolling mill, there is the welcome effect of an additional intensive cooling of the surface of the working roll. This cooling can be further intensified if each working roll is allocated two such lateral supporting means positioned on the upstream and downstream sides of the working roll, and acting on the working roll in opposite directions in a plane parallel to the rolling plane. Advantageously the hydraulic pressure medium supply line is provided with a control device which serves to control the difference between the pressing forces of the upstream and downstream supporting devices in dependence on the tractive force acting on the materials being rolled.

The invention is explained with reference to exemplified embodiments illustrated diagrammatically in the accompanying drawings, wherein.

Figure 1:
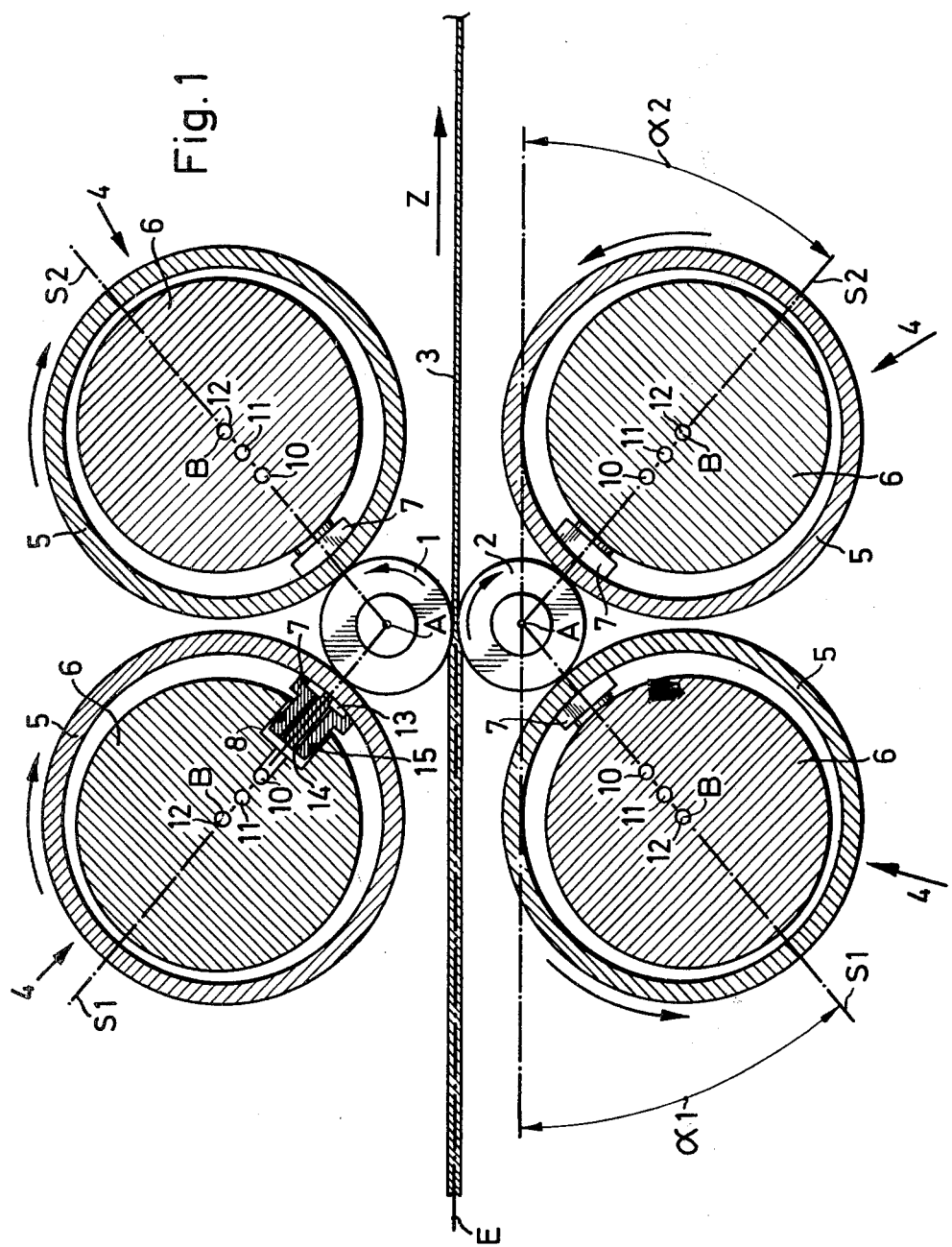
FIG. 1 is a diagrammatic section through a rolling mill according to the invention at right angles to the axes of the rolls.

FIG. 1 shows a rolling mill comprising two working rolls 1 and 2 for rolling a web 3. The web 3 may be a metal strip or a metal foil, e.g. an aluminum foil. A rolling plane E is located between the working rolls 1 and 2 and the web is moved along this plane. Sag-compensating back-up rolls 4 are provided to press the working rolls 1 and 2 toward each other and to support them, all the back-up rolls being identical in this case. Each working roll is supported on the roll shells 5 of the back-up rolls, each of the roll shells being rotatable about a fixed support beam 6. The roll shells 5 are supported on the beams 6 by piston-like hydrostatic support elements 7 guided in bores 8 in the beams. These support devices may be constructed in accordance with U.S. Pat. No. 3,802,044. Each beam 6 may be provided with a single elongated support element, or a series of support elements may be provided in cylindrical bores spaced in a row along the roll axis.

In the embodiment shown, the support elements 7 are circular in cross-section and are guided in cylindrical bores 8 which are spaced along the beam and connected to hydraulic conduits 10, 11 and 12. In order to give different supporting forces in different zones lengthwise of the rolls 4, the conduits 10 –12 may have different pressures, the bores 8 of the support devices 7 having lower pressures, for example, at the ends of the roll so that they exert a lesser pressing force than the devices in the middle zone of the rolls. As described in detail in the said U.S. Pat. No. 3,802,044, the support elements 7 may have hydrostatic bearing pockets 13 connected to the cylindrical chamber in the respective bore 8 via throttle ducts 14. The gap between the element 7 and the wall of the bore 8 is sealed by means of a ring seal 15.

For clarity, the support element 7 has been shown in section only in the case of one of the rolls in FIG. 1, but of course all the other support elements in this figure and in the other figures may be of the same construction.

In the arrangement shown in FIG. 1, the hydraulic forces of the supporting elements 7 act in support planes S1 and S2 which form two equal angles $\alpha 1$ and $\alpha 2$ with the rolling plane E. As a result of this symmetrical arrangement, this rolling mill is suitable for operation in both directions. FIG. 1 also shows a tractive force Z by means of which a pulling device (not shown) pulls the web 3 through the rolling mill.

Figure 2:
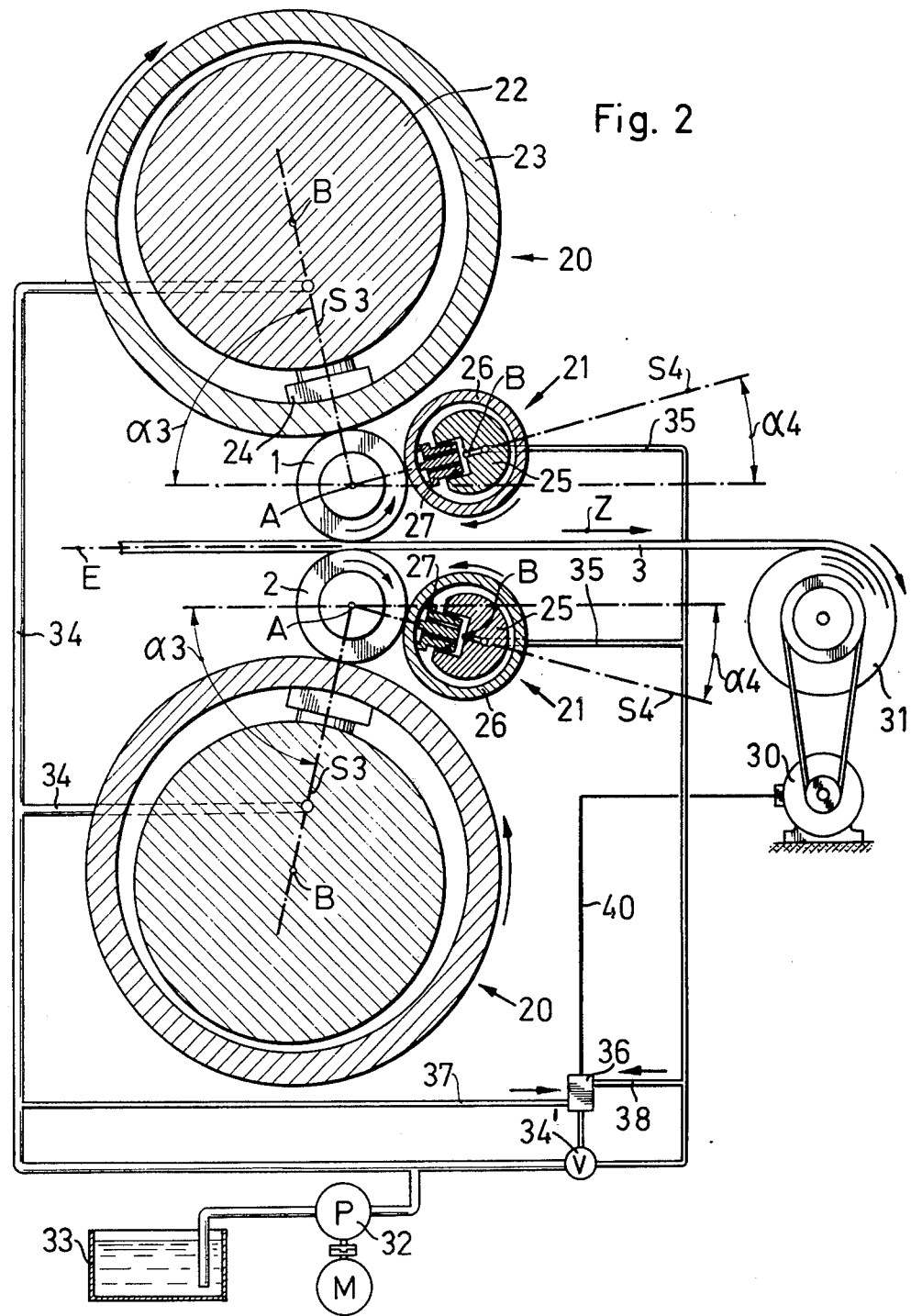
FIG. 2 is a similar section of another embodiment of the rolling mill diagrammatically showing control means for adapting the hydraulic pressure of the rolls to the tractive force of the rolled web.

FIG. 2 shows a rolling mill in which the rolls are arranged unsymmetrically on the respective side of the rolling plane E. Each of the working rolls 1 and 2 is allocated one large back-up roll 20 and one small back-up roll 21. The large back-up rolls have support beams 22, roll shells 23 and hydrostatic support devices 24 which may be of the same construction as the support devices 7 as described in connection with FIG. 1. The smaller rolls 21 have support beams 25, rolls shells 26 and hydrostatic support devices 27.

As will be seen in FIG. 2, the rolls 20 act by means of their support devices 24 in support planes S3 which are at an angle $\alpha 3$ to the rolling plane E. The smaller rolls 21 act in support planes S4 forming an angle $\alpha 4$ with the rolling plane E. The angle $\alpha 3$ is much larger than the angle $\alpha 4$.

FIG. 2 also shows a drum 31 which is driven by an electric motor 30 and serves to reel the web 3 and apply the tractive force Z. The hydraulic support devices 24 and 27 are fed with hydraulic pressure medium drawn from a tank 33 by means of a pump driven by motor M. The pressure medium is fed directly to the cylinders of the support elements 24 via conduits 34, while it is fed to the cylinders of elements 27 via conduits 35 through a throttle device 34'. The latter is associated with a control device 36 which receives signals via signal lines 37 and 38, such signals being dependent upon the pressures in the conduits 34 and 35. At the same time, the controller 36 receives via signal line 40 a signal varying according to the torque of the motor 30 and hence the tractive force Z. The controller 36 actuates the throttle device 34' to control the ratio of the pressures in the lines 34 and 35 so that the forces exerted by the rolls 20 and 21 on the working rolls 1 and 2 are in equilibrium with the tractive force Z.

Figure 3:
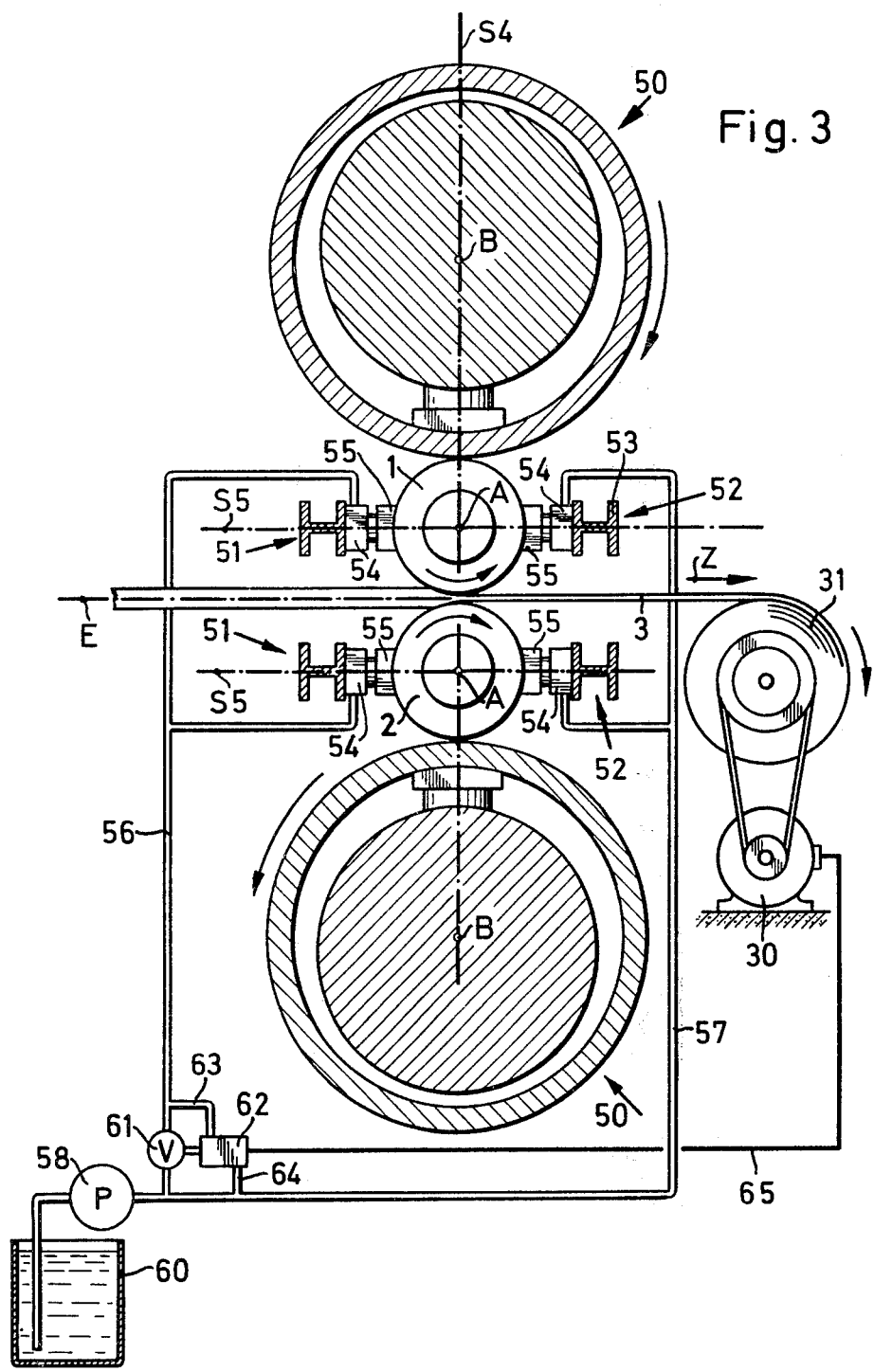
FIG. 3 is a similar section of another embodiment of the rolling mill and diagrammatically showing a modified control means for controlling the hydraulic pressures.

FIG. 3 shows a rolling mill in which sag-compensating back-up rolls 50 are provided with their support planes S4 perpendicular to the rolling plane E. Rolls 50 may be constructed as described in connection with FIGS. 1 and 2, and supplied within hydraulic fluid under pressure as desired.

Hydrostatic support devices 51, 52 are provided for lateral support of the working rolls 1, 2 in planes S5 parallel to the rolling plane E. Devices 51 and 52 each have a beam 53 which extends parallel to the respective working roll and on which hydraulic cylinders 54 are secured. The cylinders 54 contain piston members 55 and receive an hydraulic pressure medium via hydraulic conduits 56 and 57 to press the piston members 55 toward the working rolls 1, 2. Piston members 55 are constructed like members 7 in FIG. 1.

In the arrangement shown in FIG. 3, the support members 55 do not bear against the inner wall of a cylinder shell but bear directly against the surfaces of the working rolls 1, 2. The hydraulic medium in a cylinder issues between the operating surfaces of the piston member and the surface of the working roll and flows in a narrow gap between the surfaces. The hydraulic medium used in this case is a coolant which serves to cool the working rolls 1, 2 and may, for example, be an emulsion of oil in water, or an oil, preferably vegetable oil.

Arrangements similar to the lateral support devices 51, 52 of FIG. 3 are described in U.S. patent application Ser. No. 655,768 filed Feb. 6, 1976 by Dolenc, Christ and Lehmann and entitled "ROLLING MILL HAVING HYDRAULIC FORCES EXERTED ON THE EXTERIOR ROLL SURFACES." Reference may be made thereto for further details if desired.

As shown in FIG. 3, the hydraulic pressure fluid for the conduits 56 and 57 is drawn from a tank 60 by means of a pump 58. The pressure fluid is fed with the full pump pressure to the cylinders 54 of the support devices 52. Conduit 56, however, is connected to the pump 58 via a throttle device 61 which can be actuated by a controller 62. The latter receives signals indicative of the pressures in the conduits 56 and 57 via signal lines 63 and 64. The controller 62 also receives via signal line 65 a signal dependent upon the torque of the motor 30 driving the drum 31, and hence upon the tractive force Z.

Controller 62 is responsive to the tractive force Z to control the relative hydraulic pressures in lines 56 and 57 which are connected to the upstream and downstream support devices 51 and 52, respectively, to produce differences in the lateral forces acting on the respective working rolls 1, 2, the differences acting in a direction counter to the tractive force. Thus, with full pressure in conduit 57 and a lower pressure in conduit 56, devices 52 exert a greater force on the working rolls than devices 51. The difference between the forces is in the upstream direction, counter to the direction of Z. Advantageously the difference in the forces is controlled so as to produce an equilibrium of all the horizontal forces in the rolling mill, i.e. tractive force Z and the pressure forces of the elements 55 of the lateral support devices 51 and 52.

The advantage of using the coolant as a pressure medium for the elements 55 is that the working rolls 1 and 2 are also intensively cooled. The coolant flows out of the support elements 55 through the narrow gap along the surfaces of the rolls 1 and 2, there being a very good heat transfer. In this way, the coolant dissipates the heat before it can reach the interior of the roll to any great extent.

We claim:

1. A rolling mill for rolling materials in web form which comprises a pair of working rolls between which the material is rolled in a rolling plane, a pair of sag-compensating back-up rolls on respective opposite sides of said rolling plane and engaging said pair of working rolls respectively, each of said sag-compensating back-up rolls having a fixed support beam with a roll shell rotatable about the beam, at least one hydrostatic support means mounted on the beam for exerting pressure against the shell, said hydrostatic support means having at least one chamber formed in said beam, and at least one piston member disposed within said chamber and movable therein, means to supply fluid under pressure to said chamber, said piston member having an end portion facing the interior of said shell, said end portion having a plurality of hydrostatic bearing pockets formed therein, said piston member having a throttling duct communicating each of said pockets with said chamber to permit fluid under pressure to flow through said ducts to said pockets thereby continuously contacting interior surface portions of said shell and causing each piston to exert hydrostatic pressure on the respective shell toward the respective working roll in a support plane passing through the axes of corresponding working and back-up rolls, while said fluid under pressure continuously contacting said shell removes from said shell, heat generated during said material rolling process, said support plane for at least one of said working rolls being perpendicular to the rolling plane, said rolling mill further including a pair of lateral supporting means for each of said working rolls positioned on the downstream and upstream sides thereof with respect to the direction of movement of the material being rolled for exerting forces on each working roll in opposite directions in a plane parallel to the rolling plane, each lateral supporting means including at least one hydrostatic support device, supply means for supplying a coolant hydraulic medium under pressure to each of said hydrostatic support devices, said support devices each bearing directly against the surface of the respective working roll with a flow of said hydraulic medium of the device between the device and the surface of the working roll, means for exerting a tractive force on the material being rolled, and control means responsive to said tractive force for controlling the relative hydraulic pressures in the upstream and downstream support devices of each working roll to produce differences in the lateral forces acting thereon, said differences acting in a direction counter to said tractive force.

* * * * *